United States Patent
Zurian

(10) Patent No.: US 11,172,765 B1
(45) Date of Patent: Nov. 16, 2021

(54) AIRCRAFT SEAT COVER ATTACHMENT SYSTEM

(71) Applicant: B/E Aerospace, Inc., Winston-Salem, NC (US)

(72) Inventor: Charles Zurian, Kernersville, NC (US)

(73) Assignee: B/E Aerospace, Iac., Winston-Salem, NC (US)

( * ) Notice: Subject to any disclaimer, the term of this patent is extended or adjusted under 35 U.S.C. 154(b) by 0 days.

(21) Appl. No.: 17/009,444

(22) Filed: Sep. 1, 2020

(51) Int. Cl.
    *A47C 31/02* (2006.01)
    *A47C 7/32* (2006.01)
    *B64D 11/06* (2006.01)

(52) U.S. Cl.
    CPC ........ *A47C 31/023* (2013.01); *B64D 11/0647* (2014.12)

(58) Field of Classification Search
    CPC ........ A47C 31/023; A47C 7/282; A47C 31/11
    USPC .............................. 297/218.1, 218.3, 452.56
    See application file for complete search history.

(56) References Cited

U.S. PATENT DOCUMENTS

| | | | | |
|---|---|---|---|---|
| 94,553 A * | 9/1869 | Bingham | ................ | A47C 31/02 5/403 |
| 662,647 A * | 11/1900 | Howe | ........................ | E06B 7/32 297/452.64 X |
| 3,041,109 A * | 6/1962 | Eames | ...................... | A47C 3/12 297/451.4 |
| 3,088,517 A * | 5/1963 | Schwartz | .................. | A47C 7/22 297/452.63 X |
| 3,719,341 A * | 3/1973 | Harrington | ........... | E04G 11/045 249/65 |
| 3,844,612 A * | 10/1974 | Borggren | .................. | A47C 5/06 297/451.3 |
| 4,642,856 A * | 2/1987 | Harrington | ............. | E04G 11/04 24/531 |
| 5,338,091 A * | 8/1994 | Miller | ....................... | A47C 5/06 297/218.4 |
| 6,124,019 A | 9/2000 | Mense | | |
| 6,378,944 B1 * | 4/2002 | Weisser | .................. | A47C 7/282 297/218.5 X |
| 6,942,300 B2 * | 9/2005 | Numa | ..................... | A47C 7/282 297/218.3 |

(Continued)

FOREIGN PATENT DOCUMENTS

DE    3736828 C2    3/1990
DE    3920529 C1    8/1990

(Continued)

*Primary Examiner* — Rodney B White
(74) *Attorney, Agent, or Firm* — Suiter Swantz pc llo

(57) ABSTRACT

An aircraft seat may include a support system including a seat frame, a cushion including at least one surface configured to conform to a corresponding surface of the support system, a seat cover configured to fit over a portion of the cushion, and a seat cover attachment system configured to secure the seat cover to the seat frame. The seat cover attachment system may include a seat frame element of the seat frame. The seat cover attachment system may include a seat cover extrusion element configured to couple to the at least one seat frame element. The seat cover attachment system may include a seat cover retain element configured to couple to the seat cover extrusion element. A portion of the seat cover may be secured between the seat cover extrusion element and the seat cover retain element.

10 Claims, 11 Drawing Sheets

(56) References Cited

U.S. PATENT DOCUMENTS

| | | | |
|---|---|---|---|
| 6,966,606 B2* | 11/2005 | Coffield | A47C 7/282 297/452.56 X |
| 7,040,834 B2* | 5/2006 | Nardi | A47C 31/023 297/440.11 |
| 8,029,066 B2* | 10/2011 | Su | A47C 7/40 297/452.56 X |
| 8,109,576 B2* | 2/2012 | Lin | A47C 7/40 297/452.56 |
| 8,246,113 B2 | 8/2012 | Bock | |
| 8,695,306 B2 | 4/2014 | Cvek | |
| 9,161,635 B2 | 10/2015 | Toribuchi et al. | |
| 9,580,175 B2* | 2/2017 | Velasco | A47C 7/40 |
| 2018/0064263 A1* | 3/2018 | Wang | A47C 31/023 |

FOREIGN PATENT DOCUMENTS

| | | |
|---|---|---|
| EP | 0485451 A1 | 5/1992 |
| EP | 0345848 B1 | 8/1992 |
| GB | 733151 A | 7/1955 |
| GB | 1435692 A | 5/1976 |
| JP | 2003239922 A | 8/2003 |
| RU | 2649375 C1 | 4/2018 |

* cited by examiner

AIRCRAFT SEAT COVER ATTACHMENT SYSTEM

BACKGROUND

Seats may include components such as a seat cover, a cushion, and a support system. The components may be coupled together with one or more attachment assemblies. In addition, in select industries the build of the seat (and any included components within the build) may be required to meet guidelines and/or standards.

SUMMARY

An aircraft seat is disclosed, in accordance with one or more embodiments of the disclosure. The aircraft seat may include a support system including a seat frame. The aircraft seat may include a cushion including at least one surface configured to conform to a corresponding surface of the support system. The aircraft seat may include a seat cover. The seat cover may be configured to fit over a portion of the cushion. The aircraft seat may include a seat cover attachment system configured to secure the seat cover to the seat frame. The seat cover attachment system may include a seat frame element of the seat frame. The seat cover attachment system may include a seat cover extrusion element configured to couple to the at least one seat frame element. The seat cover attachment system may include a seat cover retain element configured to couple to the seat cover extrusion element. A portion of the seat cover may be secured between the seat cover extrusion element and the seat cover retain element.

In some embodiments, the seat cover extrusion element may include a channel. The seat cover retain element may be configured to fit within the channel of the seat cover extrusion element.

In some embodiments, the seat cover retain element may be configured to be inserted in the channel of the seat cover extrusion element at an angle.

In some embodiments, the seat cover retain element may include a protrusion configured to insert within a portion of the channel of the seat cover extrusion element.

In some embodiments, the seat cover retain element may be configured to disengage from the channel of the seat cover extrusion element via a force applied in a direction outward from the channel of the seat cover extrusion element.

In some embodiments, the seat cover retain element may be configured to rotate about an axis to engage the channel of the seat cover extrusion element after being inserted in the channel of the seat cover extrusion element at an angle. The portion of the seat cover may be secured between the seat cover extrusion element and the seat cover retain element when the seat cover retain element engages the channel of the seat cover extrusion element.

In some embodiments, the seat cover retain element may include a groove configured to receive a protrusion of the seat cover extrusion element after the seat cover retain element engages the channel of the seat cover extrusion element.

In some embodiments, the seat cover retain element and the seat cover extrusion element may form a seat cover element assembly.

In some embodiments, the seat frame element may include a channel. The seat cover element assembly may be configured to fit within the channel of the seat frame element.

In some embodiments, the seat cover element assembly may be configured to be inserted in the channel of the seat frame element at an angle.

In some embodiments, the seat cover element assembly may include a protrusion configured to insert within a portion of the channel of the seat frame element.

In some embodiments, the seat cover element assembly may be configured to disengage from the channel of the seat element frame via a force applied in a direction outward from the channel of the seat element frame.

In some embodiments, the seat cover element assembly may be configured to rotate about an axis to engage the channel of the seat frame element after being inserted in the channel of the seat frame element at the angle.

In some embodiments, the seat cover element assembly may include a point of contact configured to interfere with a point of contact of the seat frame element after the seat cover retain element engages the channel of the seat cover extrusion element.

A method is disclosed, in accordance with one or more embodiments of the disclosure. The method may include, but is not limited to, inserting a seat cover retain element and a portion of a seat cover within a seat cover extrusion element. The method may include, but is not limited to, rotating the seat cover retain element within the seat cover extrusion element to form a seat cover element assembly. The portion of the seat cover may be secured between the seat cover extrusion element and the seat cover retain element when the seat cover retain element engages a channel of the seat cover extrusion element. The method may include, but is not limited to, inserting the seat cover element assembly into a seat frame element. The method may include, but is not limited to, rotating the seat cover element assembly within the seat frame element to form a seat cover attachment system.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
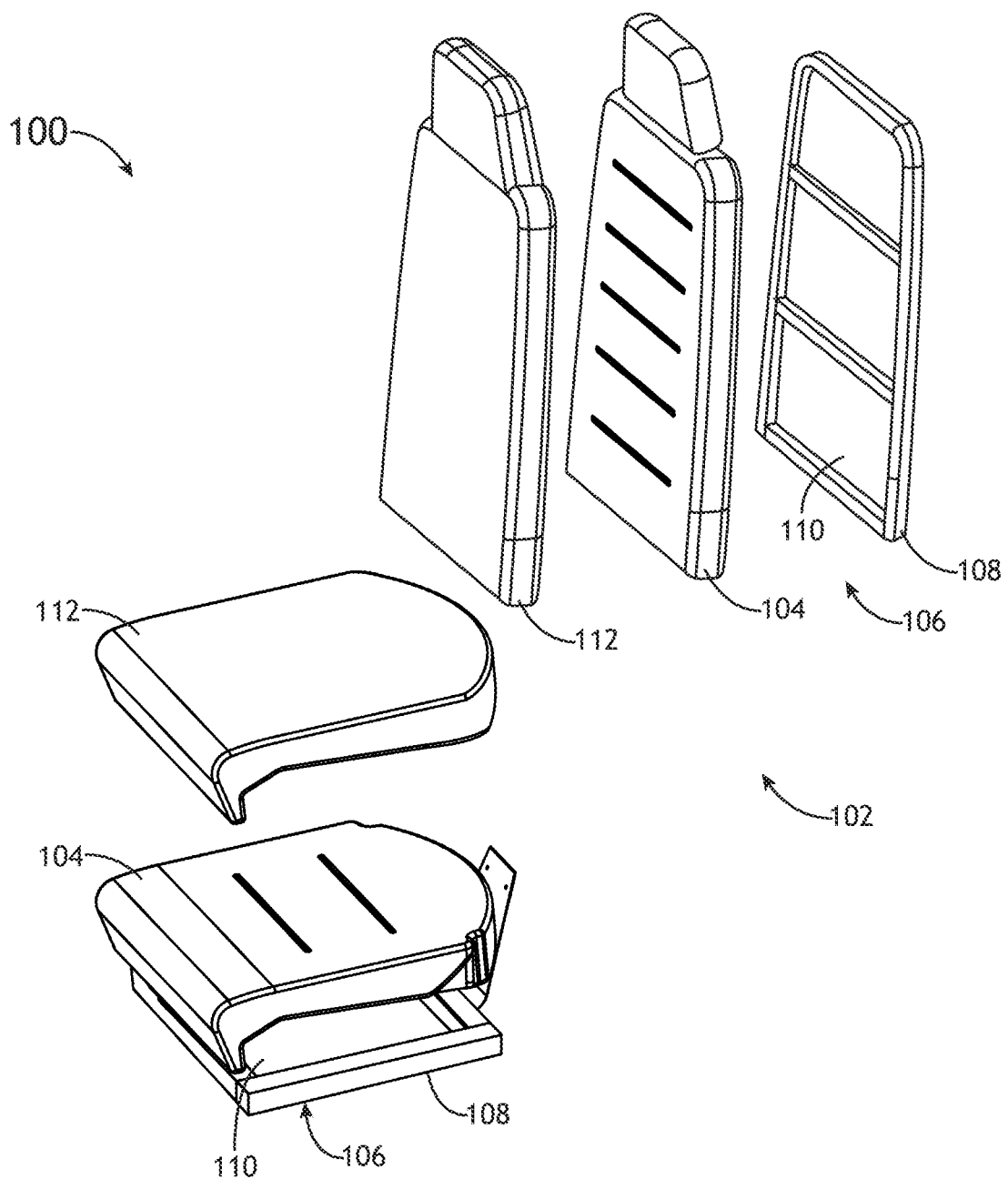
FIG. 1 illustrates an exploded perspective view of an aircraft seat including a seat cover attachment system, in accordance with one or more embodiments of the disclosure.
Figure 2A:
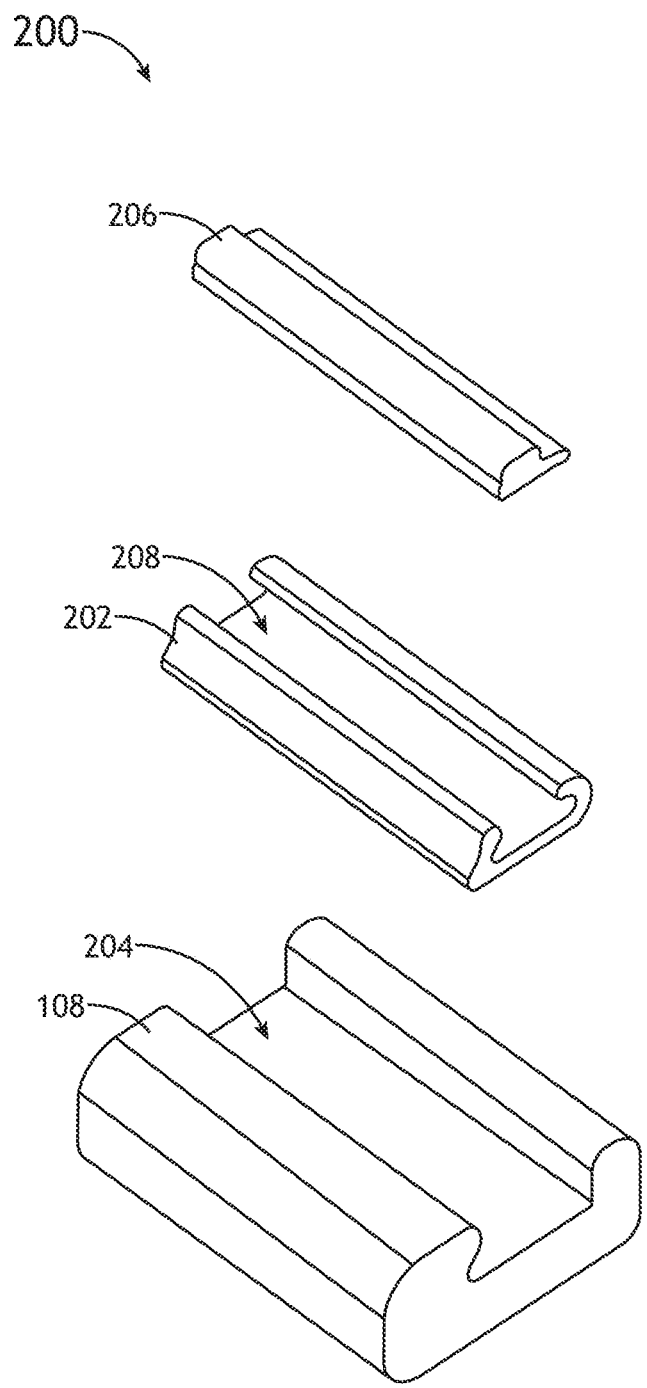
FIG. 2A illustrates an exploded perspective view of components of a seat cover attachment system, in accordance with one or more embodiments of the disclosure.
Figure 2B:
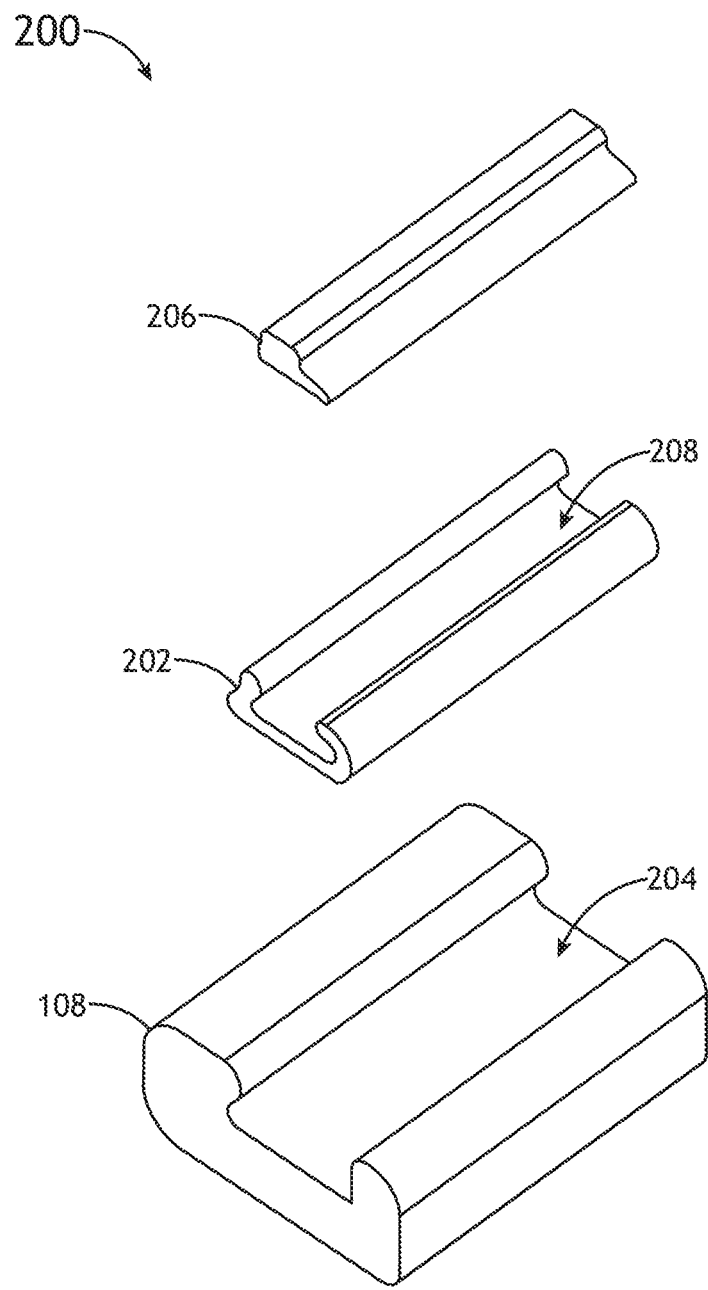
FIG. 2B illustrates an exploded perspective view of components of a seat cover attachment system, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements 108 and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-5 in general illustrate an aircraft seat cover attachment system, in accordance with one or more embodiments of the disclosure.

Seats may include components such as a seat cover, a cushion, and a support system. The components may be coupled together with one or more attachment assemblies. In select seat designs, hook-and-loop fastener assemblies (e.g., VELCRO® brand fasteners) may be used to attach the seat cover to the cushion, the cushion to the support system, and/or the seat cover to the support system. Often, multiple hook and loop fastener assemblies are used. In other select seat designs, an edge of a cushion may be trapped under a thermoformed item.

These methods of attachment may cause difficulties during alignment and/or an indeterminateness in the alignment of the seat cover, cushion, and/or support system during manufacturing and/or installation of the aircraft seat. In addition, the methods of attachment may result in increased cost in manufacturing and/or installation. Further, the methods of attachment may result in increased wear. For example, the seat cover may be subjected to stress, strain, for dirt or other mess such as airsickness, contraband, or the like resulting in damage of the seat cover.

After a period of time and/or a particular type of wear factor occurring, the seat cover may be removed for cleaning and/or replacement. Removing and re-installing the seat cover may require a method that is quick, inexpensive, and low-labor. For example, the attachment system should be quickly dismantled and put together without incurring considerable labor costs. By way of another example, re-tooling existing fabrication and manufacturing systems and processes should be inexpensive.

In addition, in select industries the build of the seat (and any included components within the build) may be required to meet guidelines and/or standards. For example, aircraft seats may be required to meet aviation guidelines and/or standards. For instance, the select aircraft seats may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. Hook and loop fasteners and pinning cushions to thermoformed items may present difficulties such as, but not limited to, failing to meet load requirements (e.g., 9 g static load requirements or 16 g dynamic load requirements as set forth by the FAA in 14 C.F.R. Part 25, AIRWORTHINESS STANDARDS: TRANSPORT CATEGORY AIRPLANES), flammability requirements, or the like.

As such, it would be desirable to provide a seat cover attachment system. The seat cover attachment system should reduce the usage of hook and loop fastener assemblies or pinning of cushions within thermoformed items, allowing for more efficient removal and installation of the seat cover. The seat cover attachment system should be inexpensive to implement, whether on a retrofitted aircraft seat or in a new aircraft seat design. The seat cover attachment system should be configured in accordance with aviation guidelines and/or standards.

Referring in general to FIGS. 1-5, one or more seat cover attachment systems may be integrated within an aircraft seat 100 installed within an aircraft cabin. For example, the aircraft seat 100 may include, but is not limited to, a business class or first-class passenger seat, an economy-class passenger seat, or the like. It is noted herein the terms "aircraft seats" and "passenger seats" may be considered equivalent, for purposes of the disclosure.

The aircraft seat 100 may be rotatable about an axis (e.g., swivelable). The aircraft seat 100 may be fully positionable between the outer limits of motion as defined by the moveable components of the aircraft seat 100. Where the aircraft seat 100 is installed within a passenger compartment, the aircraft seat 100 may be fully positionable between the outer limits of motion as defined by one or more passenger compartment monuments of the passenger compartment. It is noted herein an upright or raised position may be considered a taxi, takeoff, or landing (TTOL) position during select stages of flight (though the upright or raised position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 100 may be actuatable (e.g., translatable and/or rotatable) from the TTOL position to a non-TTOL position, and/or vice versa. Further, it is noted herein the aircraft seat 100 may be capable of a fully upright or raised position, and that the TTOL position may have a more reclined seat back cushion and a more angled upward seat pan cushion as compared to the fully upright or raised position. Therefore, the above description should not be interpreted as a limitation on the present disclosure but merely an illustration.

In general, an aircraft seat 100 of the one or more aircraft seats 100 may be translatable (e.g., trackable or slidable). The aircraft seat 100 may be rotatable about an axis crosswise through the aircraft seat 100 into a position including, but not limited to, the upright or raised position, one or more lounge or reclined positions, and a lie-flat or bed position. For example, the aircraft seat 100 may transition directly between the upright or raised position and the lie-flat or bed position. By way of another example, it is noted herein the aircraft seat 100 may transition through one or more lounge or reclined positions between the upright or raised position and the lie-flat or bed position. By way of another example, the aircraft seat 100 may transition into one or more lounge or reclined positions in a motion separate from the transition between the upright or raised position and the lie-flat or bed position. Therefore, the above description should not be interpreted as a limitation on the scope of the disclosure but merely an illustration.

The aircraft seat 100 may include a support system 102. For example, the support system 102 may include, but is not limited to, a seat pan, a seat back, or the like. The aircraft seat 100 may include a cushion 104. For example, the cushion 104 may include a seat pan cushion, a seat back cushion, or the like. The aircraft seat 100 may include a seat frame 106 including one or more seat frame elements 108.

For example, one or more seat frame elements 108 may include, but are not limited to, seat back or seat pan structural hoops. The seat frame 106 including the one or more seat frame elements 108 may form a portion of an exterior boundary of the aircraft seat 100.

The support system 102 may include a diaphragm 110. For example, the diaphragm 110 may be a seat pan diaphragm, a seat back diaphragm, or the like. By way of another example, the diaphragm 110 may include a plastic diaphragm, a metal diaphragm, a fabric diaphragm, a wire or wireframe diaphragm, or the like. The support system 102 may be a rigid structure within the aircraft seat 100, such that the support system 102 does not move. The support system 102 may include one or more movable components such that the support system 102 may articulate. For example, the support system 102 may articulate when the aircraft seat 100 actuates between the upright or raised position, the one or more lounge or reclined positions, and/or the lie-flat or bed position.

The cushion 104 may conform or substantially conform to the support system 102. For example, at least one surface of the cushion 104 may conform to a corresponding surface of the support system 102. By way of another example, components of the support system 102 (e.g., components including, but not limited to, straps configured to couple the diaphragm 110 to the seat frame 106 with the one or more seat frame elements 108, where the support system 102 is or includes the diaphragm 110) may extend beyond the boundaries of the cushion 104, such that the at least one surface of the cushion 104 does not fully conform to the corresponding surface of the support system 102. By way of another example, a portion of the cushion 104 may wrap around or otherwise enclose a portion of the support system 102 (e.g., including, but not limited to, a front edge or leading portion of the cushion 104). In general, the support system 102 may conform to a portion of a user (e.g., a passenger, a crew member, or the like), and the cushion 104 may similarly conform to the portion of the user due to the cushion 104 conforming to the support system 102.

The aircraft seat 100 may include a seat cover 112. The seat cover 112 may be configured to fit over at least a portion of the cushion 104. For example, the seat cover 112 may be configured to wrap around or otherwise enclose exterior surfaces of the cushion 104 not proximate to the support system 102. The seat cover 112 may be configured to attach to the support system 102 and/or the cushion 104. It is noted herein "seat cover" and "dress cover" may be considered equivalent, for purposes of the disclosure.

Figure 4:
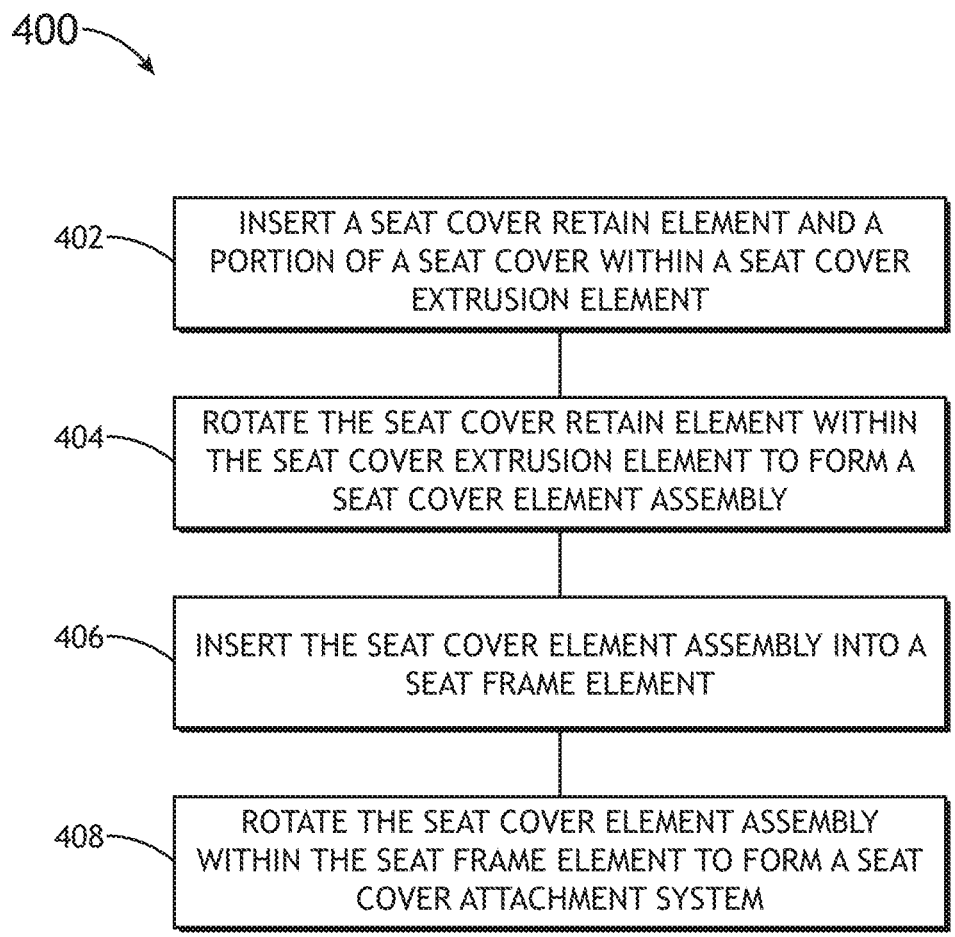
FIG. 4 is a method for assembling a seat cover attachment system, in accordance with one or more embodiments of the disclosure.
Figure 5:
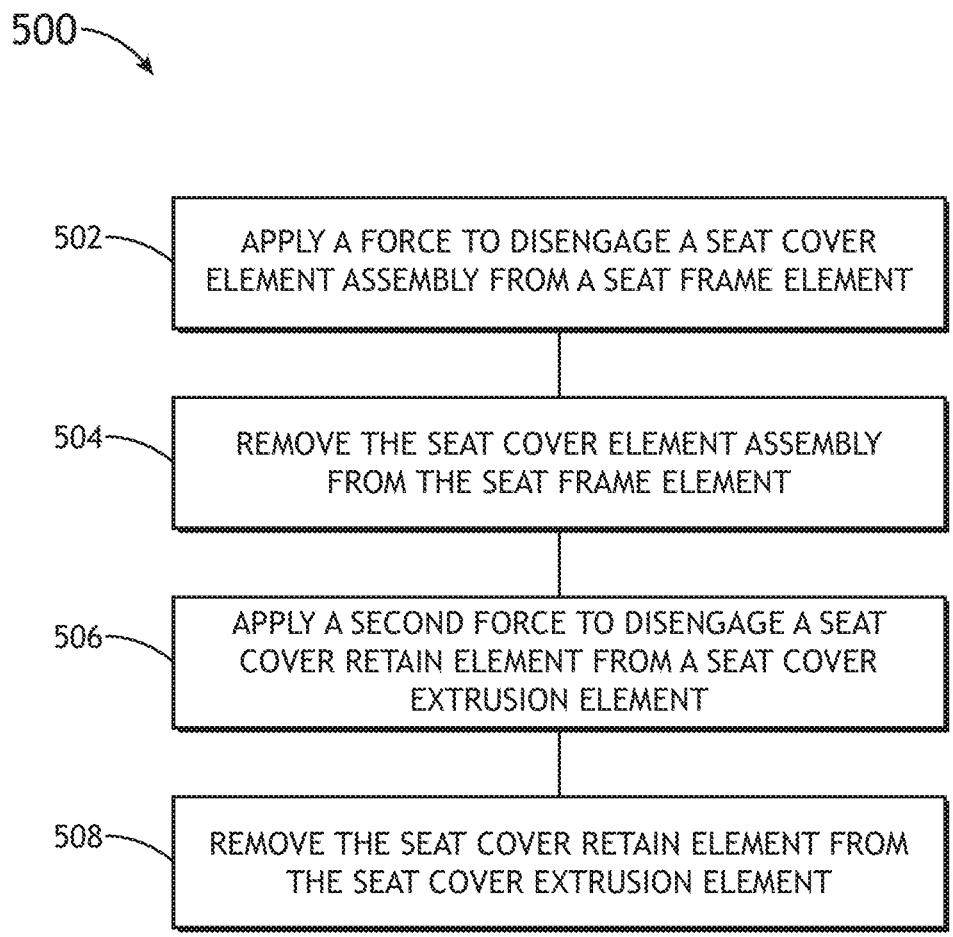
FIG. 5 is a method for assembling a seat cover attachment system, in accordance with one or more embodiments of the disclosure.

FIGS. 2A-3F illustrate components of a seat cover attachment system 200, in accordance with one or more embodiments of the disclosure. FIG. 4 is a method or process 400 for assembling the seat cover attachment system 200, in accordance with one or more embodiments of the disclosure. FIG. 5 is a method or process 500 for assembling the seat cover attachment system 200, in accordance with one or more embodiments of the disclosure. It is noted herein "seat cover attachment system" and variants including, but not limited to, "attachment system" or "system may be considered equivalent, for purposes of the disclosure.

The attachment system 200 may include a particular seat frame element 108 of the seat frame 106. The attachment system 200 may include a seat cover extrusion element 202. For example, the seat cover extrusion element 202 may be configured to fit within a channel 204 of the seat frame element 108 of the seat frame 106. The attachment system 200 may include a seat cover retain element 206. For example, the seat cover retain element 206 may be configured to fit within a channel 208 of the seat cover extrusion element 202. The attachment system 200 may include the seat cover 112. For example, a portion of the seat cover 112 may be configured to fit between the seat cover extrusion element 202 and the seat cover retain element 206. For instance, the portion of the seat cover 112 may be configured to fit within the channel 208 of the seat cover extrusion element 202 along with the fitting of the seat cover retain element 206.

It is noted herein new tooling for the components of the attachment system 200 may be limited to a few extrusion dies. As illustrated in the following methods and processes, coupling or uncoupling the components of the attachment system 200 may not require fasteners, drilling, bonding or other coupling processes prior to or during assembly of seat cover attachment system 200 to the seat cover 112 or the seat cover 112 to the frame 106.

Assembling the attachment system 200 may include one or more of the following steps of the method or process 400:

In a step 402, a seat cover retain element and at least a portion of a seat cover may be inserted within a seat cover extrusion element. A protrusion 300 of the seat cover retain element 206 may be inserted at an angle 302 into a portion 304 of the channel 208 of the seat cover extrusion element 202. The at least the portion of the seat cover 112 may be inserted between the protrusion 300 of the seat cover retain element 206 and a sidewall of the portion 304 of the channel 208 of the seat cover extrusion element 202 when the seat cover retain element 206 is inserted at the angle 302. It is noted herein the protrusion 300 of the seat cover retain element 202 and the portion 304 of the channel 208 may be considered an interlocking assembly 306, for purposes of the disclosure.

It is noted herein the angle 302 is not limited to a single angle, but rather represents a range of angles from which the seat cover retain element 206 may be inserted into the portion 304 of the channel 208 of the seat cover extrusion element 202. Therefore, the above description should not be interpreted as a limitation on the present disclosure but merely an illustration.

In a step 404, the seat cover retain element may be rotated within the seat cover extrusion element to form a seat cover element assembly. The seat cover retain element 206 may be rotated about an axis 308 through the protrusion 300 to engage (e.g., seat within) the channel 208 of the seat cover extrusion element 202 with the seat cover retain element 206. The engaging of the seat cover retain element 206 within the channel 208 of the seat cover extrusion element 202 may form a seat cover element assembly 310.

The seat cover retain element 206 may continue to engage the channel 208 of the seat cover extrusion element 202 via an interlocking assembly 312 absent an external force, due to interference within the interlocking assembly 312. For example, the interlocking assembly 312 may include a protrusion 314 and a groove 316 on the seat cover retain element 206 and the seat cover extrusion element 202. For instance, the seat cover extrusion element 202 may include the protrusion 314 and the seat cover retain element 206 may include the groove 316. In addition, the seat cover extrusion element 202 may include the groove 316 and the seat cover retain element 206 may include the protrusion 314. In general, the protrusion 314 and the groove 316 may be configured to allow the seat cover retain element 206 to engage the seat cover extrusion element 202 (e.g., with one component sliding past another) during rotation about the axis 308, and continue to engage absent the external force.

It is noted herein the seat cover extrusion element 202 may be flexible enough to elastically deform during the seating of the seat cover retain element 206. In addition, it is noted herein the seat cover 112 may be compressible enough to be pinned between the seat cover extrusion element 202 and the seat cover retain element 206.

In this regard, the seating of the seat cover retain element 206 within the channel 208 of the seat cover extrusion element 202 may secure the seat cover 112 within the seat cover element assembly 310.

In a step 406, the seat cover element assembly may be inserted into a seat frame element. A protrusion 318 of the seat cover element assembly 310 may be inserted at an angle 320 into a portion 322 of a channel 204 of a seat frame element 108. For example, the protrusion 318 may be a component on a first surface of the seat cover extrusion element 206, and the portion 322 may be on a first side of the channel 204. It is noted herein the protrusion 318 of the seat cover element assembly 310 and the portion 322 of the channel 204 may be considered an interlocking assembly 324, for purposes of the disclosure.

A surface of the seat cover element assembly 310 corresponding to the protrusion 318 and a surface of the portion 322 may come into contact at one or more locations when the seat cover element assembly 310 engages the channel 204 of the seat frame element 108. For example, the surface of the seat cover element assembly 310 and the surface of the portion 322 may come into contact at 1, 2, up to an N number of locations. For instance, the surface of the seat cover element assembly 310 and the surface of the portion 322 may include a single point of contact. In addition, the surface of the seat cover element assembly 310 and the surface of the portion 322 may include two or more points of contact. Further, the surface of the seat cover element assembly 310 and the surface of the portion 322 may be in continuous contact.

It is noted herein the angle 320 is not limited to a single angle, but rather represents a range of angles from which the seat cover element assembly 310 may be inserted into the portion 322 of the channel 204 of the seat frame element 108. Therefore, the above description should not be interpreted as a limitation on the present disclosure but merely an illustration.

In a step 408, the seat cover element assembly may be rotated within the seat frame element to form a seat cover attachment system. The seat cover element assembly 310 may be rotated about an axis 326 proximate to the protrusion 318 to seat the seat cover element assembly 310 within the channel 204 of the seat frame element 108. The seating of the seat cover element assembly 310 within the channel 204 of the seat frame element 108 may form the seat cover attachment system 200.

The seat cover element assembly 310 may continue to engage the channel 204 of the seat frame element 108 via an interlocking assembly 328 absent an external force, due to interference within the interlocking assembly 328.

For example, the interlocking assembly 328 may employ interference (e.g., as friction) between a set of points of contact 330, 332 of the seat cover element assembly 310 and the seat frame element 108, respectively. For instance, the point of contact 330 may be on a second surface of the seat cover extrusion element 206, the second surface being opposite (or at least spaced apart from) the first surface of the seat cover extrusion element 206. In addition, the point of contact 332 may be on a second side of the channel 204, the second side of the channel 204 being opposite (or at least spaced apart from) the first side of the channel 204.

The interlocking assembly 328 may include one or more sets of points of contact 330, 332. For example, the interlocking assembly 328 may include 1, 2, up to an N number of sets of points of contact 330, 332. For instance, the interlocking assembly 328 may include a single set of points of contact 330, 332. In addition, two or more points of contact 330, 332. Further, the interlocking assembly 328 may be in continuous contact.

By way of another example, the interlocking assembly 328 may include a protrusion and a groove on the seat cover element assembly 310 and the seat frame element 108. For instance, the seat cover element assembly 310 may include the protrusion and the seat frame element 108 may include the groove. In addition, the seat cover element assembly 310 may include the groove and the seat frame element 108 may include the protrusion. In general, the protrusion and the groove may be configured to allow the seat cover element assembly 208 to engage the seat element frame 106 (e.g., with one component sliding past another) during rotation about the axis 326, and continue to engage absent the external force.

In this regard, the seating of the seat cover element assembly 208 within the channel 204 of the seat frame element 108 may secure the seat cover 112 within the seat frame element 108.

It is noted herein a direction of rotation about the axis 308 or the axis 326 may be the same or different depending on the arrangement of the interlocking assemblies 310, 312, 324, 328 within the attachment system 200. For example, the direction of rotation about the axis 308 may be in a first direction and the direction of rotation about the axis 326 may be in a second direction. For instance, the direction of rotation about the axis 308 may be in a counter-clockwise direction and the direction of rotation about the axis 326 may be in a clockwise direction.

It is noted herein a direction of insertion at the angle 302 or the angle 320 may be the same or different depending on the arrangement of the interlocking assemblies 310, 312, 324, 328 within the attachment system 200. For example, the direction of insertion at the angle 302 may be in a first direction and the direction of insertion at the angle 320 may be in a second direction. For instance, the direction of insertion at the angle 302 may be in a positive direction (e.g., in a position x direction) and the direction of insertion at the angle 320 may be in a negative direction (e.g., in a negative x direction).

Disassembling the attachment system 200 may include one or more of the following steps of the method or process 500:

In a step 502, a force may be applied to disengage (e.g., unseat from) a seat cover element assembly from a seat frame element. For example, the force may be applied either with a tool (e.g., a flat blade, a flathead screwdriver, or the like) or through an application of force on the seat cover 112 in a specific direction, the specific direction not being one accomplished when sitting in the aircraft seat 100. For instance, the direction may be outward from the channel 204, or at/approximate to 90 degrees from a seating surface of the aircraft seat 100. It is noted herein pulling in a different direction may cause the seat cover element assembly 208 to tighten against the seat frame element 108. The force may cause the interlocking assembly 328 to disconnect. The seat cover element assembly 310 may be rotated about the axis 326 proximate to the protrusion 318 to seat the seat cover element assembly 310 within the channel 204 of the seat frame element 108.

In a step 504, the seat cover element assembly may be removed from the seat frame element. The protrusion 318 of the seat cover element assembly 310 may be removed at the angle 320 into a portion 322 of a channel 204 of a seat frame element 108.

It is noted herein the angle 320 is not limited to a single angle, but rather represents a range of angles from which the seat cover element assembly 310 may be removed from the portion 322 of the channel 204 of the seat frame element 108. Therefore, the above description should not be interpreted as a limitation on the present disclosure but merely an illustration.

In a step 506, a second force may be applied to disengage a seat cover retain element from a seat cover extrusion element. For example, the second force may be applied either with a tool (e.g., a flat blade, a flathead screwdriver, or the like) or through an application of force on the seat cover 112 in a specific direction, the specific direction not being one accomplished when sitting in the aircraft seat 100. For instance, the direction may be outward from the channel 208, or at/approximate to 90 degrees from a seating surface of the aircraft seat 100. It is noted herein pulling in a different direction may cause the seat cover retain element 206 to tighten against the seat cover extrusion element 202. The second force may cause the interlocking assembly 312 to disconnect. The seat cover retain element 206 may be rotated about the axis 308 through the protrusion 300 to disengage the seat cover retain element 206 within the channel 208 of the seat cover extrusion element 202.

In a step 508, the seat cover retain element may be removed from the seat cover extrusion element. The protrusion 300 of the seat cover retain element 206 may be removed at the angle 302 into the portion 304 of the channel 208 of the seat cover extrusion element 202. The at least the portion of the seat cover 112 may be removed from between the protrusion 300 of the seat cover retain element 206 and the sidewall of the portion (e.g., a groove) of the channel 208 of the seat cover extrusion element 202 when the seat cover retain element 206 is removed at the angle 302.

It is noted herein the angle 302 is not limited to a single angle, but rather represents a range of angles from which the seat cover retain element 206 may be removed from the portion 304 of the channel 208 of the seat cover extrusion element 202. Therefore, the above description should not be interpreted as a limitation on the present disclosure but merely an illustration.

It is noted herein the methods or processes 400, 500 is not limited to the steps and/or sub-steps provided. The methods or processes 400, 500 may include more or fewer steps and/or sub-steps. In addition, the methods or processes 400, 500 may perform the steps and/or sub-steps simultaneously. Further, the methods or processes 400, 500 may perform the steps and/or sub-steps sequentially, including in the order provided or an order other than provided. Therefore, the above description should not be interpreted as a limitation on the scope of the disclosure but merely an illustration.

Although embodiments of the disclosure illustrate coupling or uncoupling various components of the attachment system 200 from above as illustrated in at least FIGS. 3A-3E, it is noted herein various component of the attachment system 200 may be coupled or uncoupled from a front or rear direction with enough applied force. Therefore, the above description should not be interpreted as a limitation on the scope of the disclosure but merely an illustration.

Figure 3A:
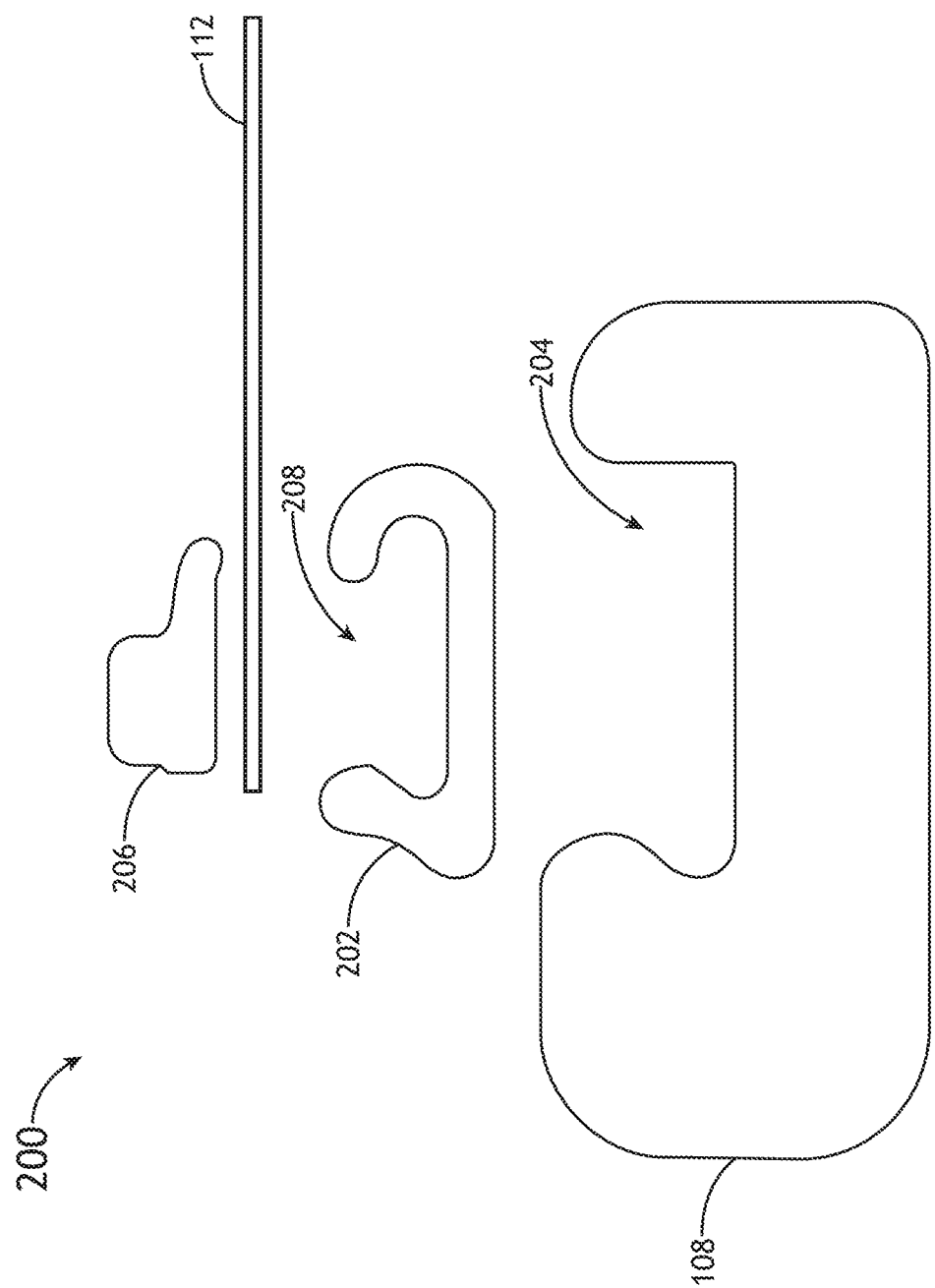
FIG. 3A illustrates a perspective view of a seat cover attachment system, in accordance with one or more embodiments of the disclosure.
Figure 3B:
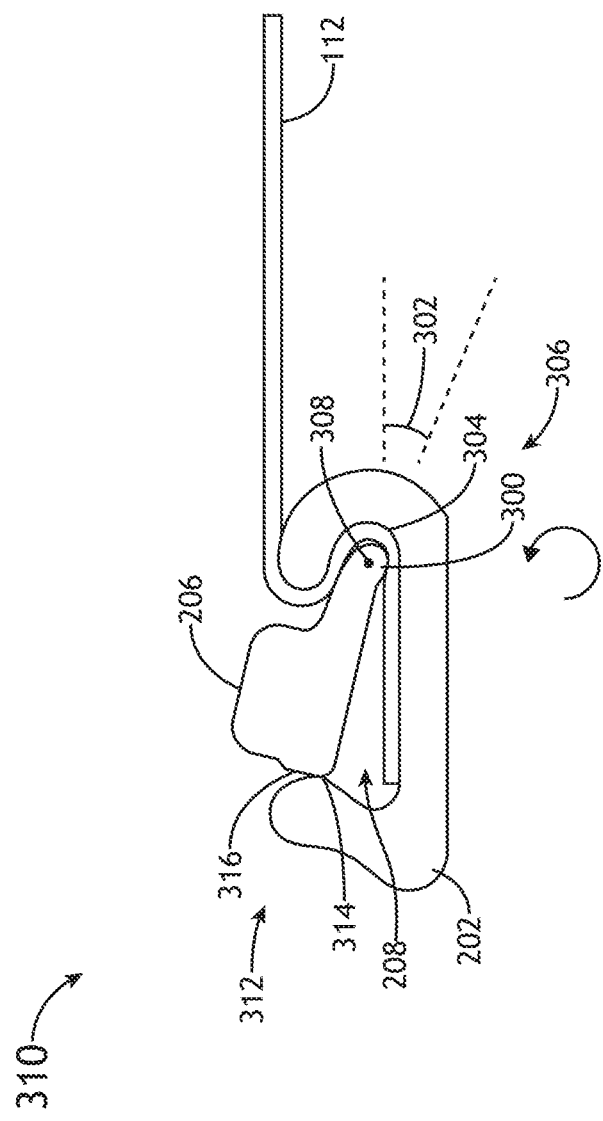
FIG. 3B illustrates a side view of components of a seat cover attachment system, in accordance with one or more embodiments of the disclosure.
Figure 3C:
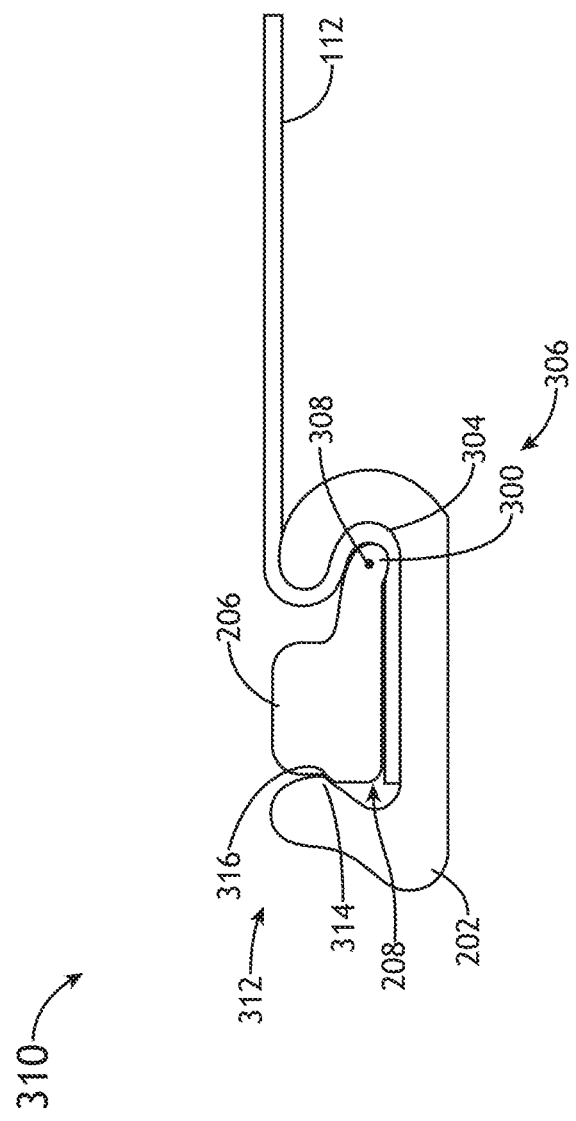
FIG. 3C illustrates a side view of components of a seat cover attachment system, in accordance with one or more embodiments of the disclosure.
Figure 3D:
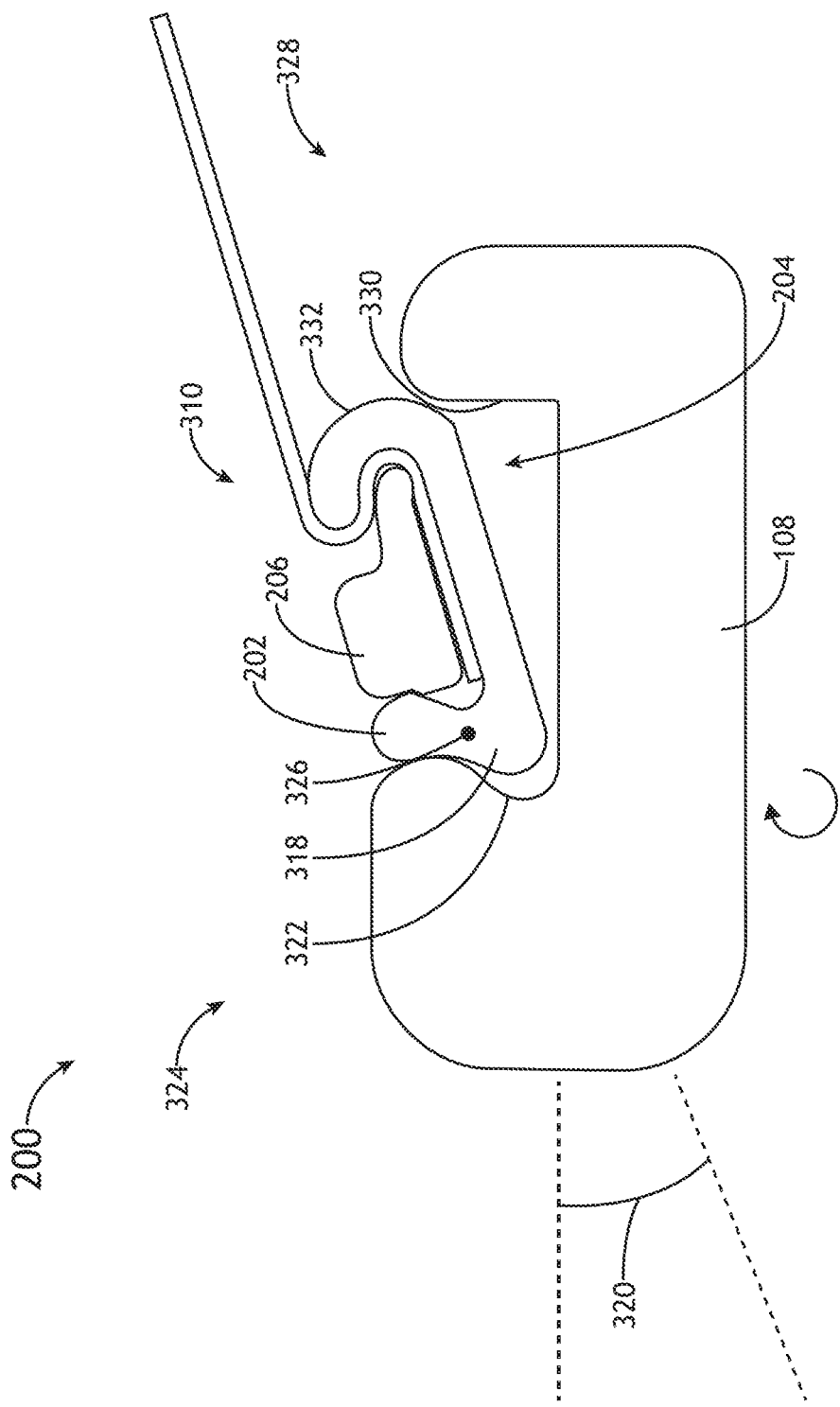
FIG. 3D illustrates a side view of a seat cover attachment system, in accordance with one or more embodiments of the disclosure.
Figure 3E:
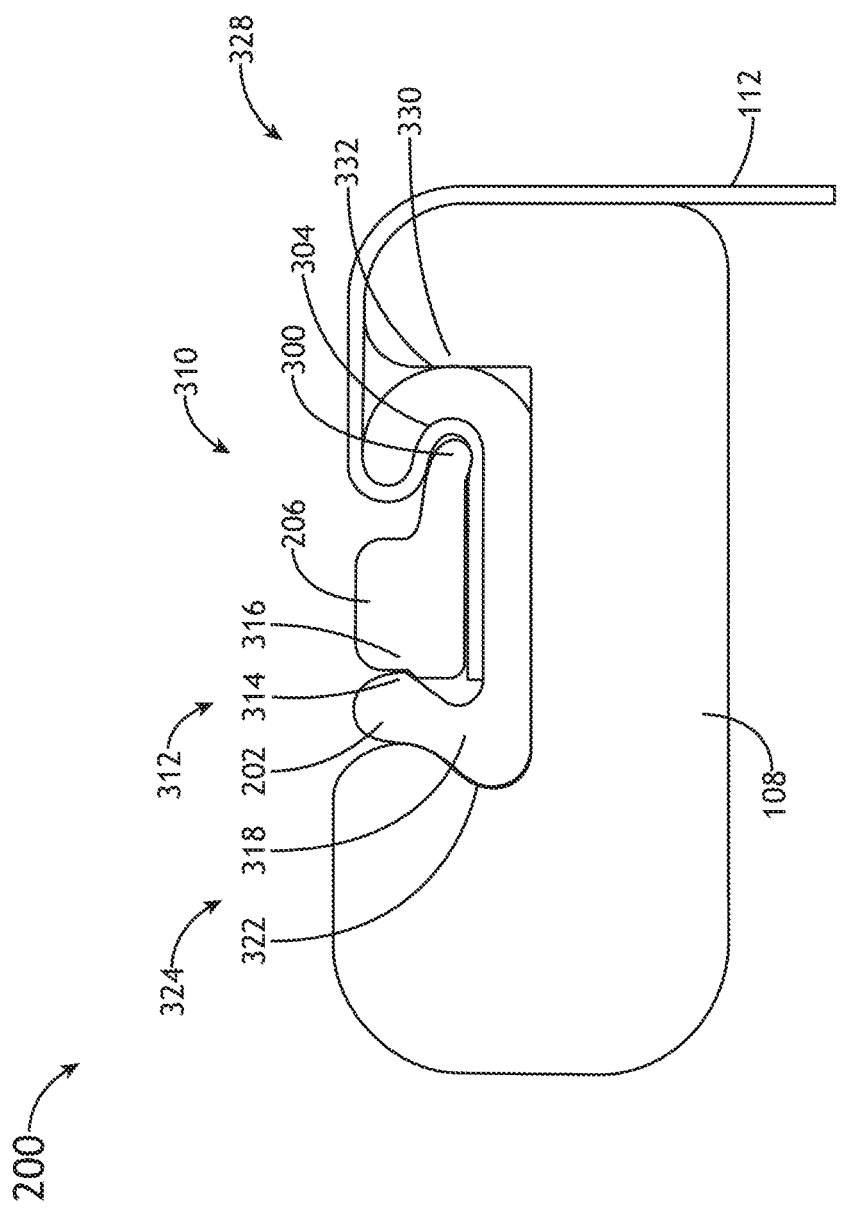
FIG. 3E illustrates a side view of a seat cover attachment system, in accordance with one or more embodiments of the disclosure.
Figure 3F:
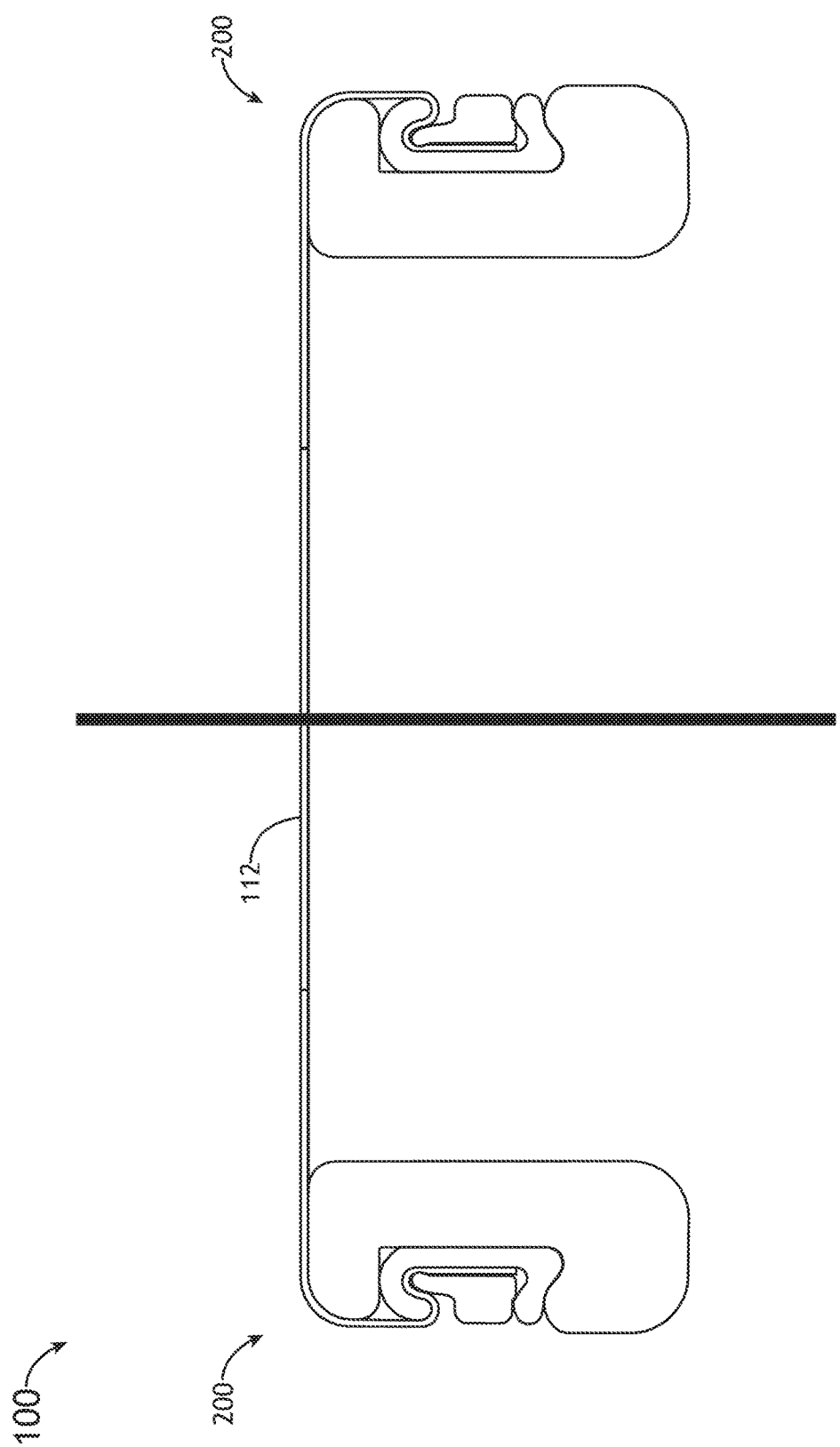
FIG. 3F illustrates a cross-section of an aircraft seat including a seat cover attachment system, in accordance with one or more embodiments of the disclosure.

As illustrated in FIG. 3F, the aircraft seat 100 may employ multiple seat cover attachment systems 200. For example, the seat cover attachment systems 200 may be disposed about a centerline of the aircraft seat 100, securing the seat cover 112 across the centerline of the aircraft seat 100. Tension applied to the seat cover material (e.g., applied when an occupant is seated in the aircraft seat 100) may be counteracted by the configuration of the seat cover attachment system 200, such that the seat cover attachment systems 200 do not disengage.

In this regard, the seat cover attachment system 200 reduces the usage of hook and loop fastener assemblies or pinning of cushions within thermoformed items, allowing for more efficient removal and installation of the seat cover 112. For example, the seat cover attachment system 200 may allow for alignment of aircraft seat 100 components, a more efficient review and search of the aircraft seat 100 for issues, and easier replacement of aircraft seat 100 components. The seat cover attachment system 200 is inexpensive to implement both on a retrofitted aircraft seat 100 or in a new aircraft seat 100 design, requiring a few retooled dies and no coupling fabrication processes. The seat cover attachment system 200 is be configured in accordance with aviation guidelines and/or standards.

It is noted herein the seat cover attachment system 200 may be configured to work with any aircraft seat 100 and/or any set of components in the aircraft seat 100. For example, the seat cover attachment system 200 may be configured to take into account any changes in shape of the components of the aircraft seat 100 (e.g., within an x-y plane forming a seating surface for an occupant), where the changes in shape may be caused by or otherwise dependent on the location of the aircraft seat 100 within the aircraft cabin.

Although embodiments of the disclosure illustrate the seat cover attachment system 200 being integrated within the aircraft seat 100, it is noted herein, however, that the seat cover attachment system 200 and/or components of the seat cover attachment system 200 are not limited to the aviation environment and/or the aircraft components within the aviation environment. For example, the seat cover attachment system 200 and/or components of the seat cover attachment system 200 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the seat cover attachment system 200 and/or components of the seat cover attachment system 200 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat, comprising:
   a support system including a seat frame;
   a cushion including at least one surface configured to conform to a corresponding surface of the support system;
   a seat cover, the seat cover configured to fit over a portion of the cushion; and
   a seat cover attachment system configured to secure the seat cover to the seat frame, the seat cover attachment system comprising:
   a seat frame element of the seat frame, the seat frame including the seat frame element forming a portion of an exterior boundary of the aircraft seat, the seat frame element including a channel;
   a seat cover extrusion element configured to couple to the at least one seat frame element, the seat cover extrusion element including a channel; and
   a seat cover retain element configured to couple to the seat cover extrusion element, the seat cover retain element configured to fit within the channel of the seat cover extrusion element, the seat cover retain element configured to rotate about an axis to engage the channel of the seat cover extrusion element after being inserted into the channel of the seat cover extrusion element at an angle, a portion of the seat cover being secured between the seat cover extrusion element and the seat cover retain element when the seat cover retain element engages the channel of the seat cover extrusion element;
   the seat cover retain element and the seat cover extrusion element forming a seat cover element assembly when the seat cover retain element engages the channel of the seat cover extrusion element, the seat cover element assembly configured to be inserted into the channel of the seat frame element, the portion of the seat cover secured between the seat cover extrusion element and the seat cover retain element prior to inserting the seat cover element assembly into the channel of the seat frame element.

2. The aircraft seat of claim 1, the seat cover retain element including a protrusion configured to insert within a portion of the channel of the seat cover extrusion element.

3. The aircraft seat of claim 1, the seat cover retain element configured to disengage from the channel of the seat cover extrusion element via a force applied in a direction outward from the channel of the seat cover extrusion element.

4. The aircraft seat of claim 1, the seat cover retain element including a groove configured to receive a protrusion of the seat cover extrusion element after the seat cover retain element engages the channel of the seat cover extrusion element.

5. The aircraft seat of claim 1, the seat cover element assembly configured to be inserted in the channel of the seat frame element at an angle.

6. The aircraft seat of claim 5, the seat cover element assembly including a protrusion configured to insert within a portion of the channel of the seat frame element.

7. The aircraft seat of claim 5, the seat cover element assembly configured to disengage from the channel of the seat element frame via a force applied in a direction outward from the channel of the seat element frame.

8. The aircraft seat of claim 5, the seat cover element assembly configured to rotate about an axis to engage the channel of the seat frame element after being inserted in the channel of the seat frame element at the angle.

9. The aircraft seat of claim 8, the seat cover element assembly including a point of contact configured to interfere with a point of contact of the seat frame element after the seat cover retain element engages the channel of the seat cover extrusion element.

10. A method comprising:
inserting a seat cover retain element and a portion of a seat cover within a seat cover extrusion element;
rotating the seat cover retain element within the seat cover extrusion element to form a seat cover element assembly, the portion of the seat cover being secured between the seat cover extrusion element and the seat cover retain element when the seat cover retain element engages a channel of the seat cover extrusion element;
inserting the seat cover element assembly into a seat frame element, the portion of the seat cover being secured between the seat cover extrusion element and the seat cover retain element prior to inserting the seat cover element assembly into the seat frame element; and
rotating the seat cover element assembly within the seat frame element to form a seat cover attachment system.

\* \* \* \* \*